United States Patent
Woodman

(10) Patent No.: US 7,837,607 B2
(45) Date of Patent: Nov. 23, 2010

(54) CENTRIFUGE ROTOR ASSEMBLY AND METHOD OF CONNECTION THEREOF

(75) Inventor: James R. Woodman, Hopkinton, MA (US)

(73) Assignee: Thermo Fisher Scientific Inc., Waltham, MA (US)

(*) Notice: Subject to any disclaimer, the term of this patent is extended or adjusted under 35 U.S.C. 154(b) by 919 days.

(21) Appl. No.: 11/637,920

(22) Filed: Dec. 13, 2006

(65) Prior Publication Data

US 2008/0146429 A1 Jun. 19, 2008

(51) Int. Cl.
*B04B 7/06* (2006.01)
*B04B 5/02* (2006.01)

(52) U.S. Cl. .......................... 494/12; 494/20
(58) Field of Classification Search ............... 494/12, 494/16, 20, 33, 38, 64, 84, 85; 210/232
See application file for complete search history.

(56) References Cited

U.S. PATENT DOCUMENTS

| | | | | |
|---|---|---|---|---|
| 2,827,229 A | * | 3/1958 | Blum | 494/16 |
| 2,865,662 A | * | 12/1958 | Nurmse | 242/318 |
| 3,028,075 A | * | 4/1962 | Blum | 494/20 |
| 3,819,111 A | * | 6/1974 | Romanauskas et al. | 494/16 |
| 3,843,045 A | * | 10/1974 | Schmidt et al. | 494/27 |
| 3,961,745 A | * | 6/1976 | Wright | 494/9 |
| 4,010,890 A | * | 3/1977 | Wright | 494/37 |
| 4,344,563 A | * | 8/1982 | Romanauskas | 494/20 |
| 4,360,151 A | * | 11/1982 | Cowell et al. | 494/10 |
| 4,412,830 A | * | 11/1983 | Strain et al. | 494/12 |
| 4,435,169 A | * | 3/1984 | Romanauskas | 494/20 |
| 4,753,631 A | * | 6/1988 | Romanauskas | 494/9 |
| 4,850,951 A | * | 7/1989 | Cheng et al. | 494/16 |
| 5,071,402 A | * | 12/1991 | Weyant, Jr. | 494/16 |
| 5,342,282 A | * | 8/1994 | Letourneur | 494/82 |
| 5,344,380 A | * | 9/1994 | Chern et al. | 494/12 |
| 5,411,465 A | * | 5/1995 | Glen et al. | 494/16 |
| 5,443,438 A | * | 8/1995 | Wright et al. | 494/84 |
| 5,456,653 A | * | 10/1995 | Wright | 494/82 |
| 5,512,030 A | * | 4/1996 | Barkus | 494/16 |

(Continued)

FOREIGN PATENT DOCUMENTS

DE 3334655 A1 * 4/1985

(Continued)

OTHER PUBLICATIONS

Patent Cooperation Treaty, International Search Report and Written Opinion of the International Searching Authority, International Application No. PCT/US2007/025396, date of mailing Jul. 23, 2008.

(Continued)

*Primary Examiner*—Charles E Cooley
(74) *Attorney, Agent, or Firm*—Wood, Herron & Evans, LLP

(57) ABSTRACT

A rotor assembly includes an actuator moveable between a first position and a second position. The rotator assembly also includes an engagement mechanism connected and moveable relative to the actuator, wherein the engagement mechanism engages a portion of a centrifuge when the actuator is in the first position and disengages from the portion of the centrifuge when the actuator is in the second position. Also, a method of connecting a rotor assembly to a centrifuge.

17 Claims, 4 Drawing Sheets

U.S. PATENT DOCUMENTS

| | | | | |
|---|---|---|---|---|
| 5,558,616 | A * | 9/1996 | Barkus et al. | 494/12 |
| 5,681,257 | A * | 10/1997 | Letourneur | 494/12 |
| 5,897,482 | A * | 4/1999 | Lowe | 494/12 |
| 6,056,684 | A * | 5/2000 | Linder et al. | 494/12 |
| 6,063,018 | A * | 5/2000 | Letourneur | 494/12 |
| 6,149,570 | A * | 11/2000 | Lowe et al. | 494/12 |
| 6,149,571 | A * | 11/2000 | Okada et al. | 494/20 |
| 6,183,408 | B1 * | 2/2001 | Wright et al. | 494/82 |
| 6,286,838 | B1 * | 9/2001 | Kruger et al. | 277/549 |
| 6,383,126 | B1 * | 5/2002 | Fondin | 494/7 |
| 6,461,287 | B1 * | 10/2002 | Glater | 494/16 |
| 6,665,924 | B2 * | 12/2003 | Schutz | 29/525.11 |
| 6,764,438 | B2 * | 7/2004 | Potter | 494/12 |
| 6,776,751 | B2 * | 8/2004 | Potter | 494/12 |
| 6,802,803 | B2 * | 10/2004 | Potter | 494/12 |
| 6,840,705 | B2 * | 1/2005 | Rager | 403/325 |
| 6,981,304 | B2 * | 1/2006 | Potter | 29/450 |
| 7,011,618 | B2 * | 3/2006 | Potter | 494/12 |
| 7,081,081 | B2 * | 7/2006 | Schutz et al. | 494/12 |
| 7,137,198 | B2 * | 11/2006 | Potter | 29/889 |
| 7,311,652 | B2 * | 12/2007 | Henne | 494/12 |
| 7,419,464 | B2 * | 9/2008 | Matusima | 494/84 |
| 7,464,450 | B2 * | 12/2008 | Potter | 29/428 |
| 2003/0144124 | A1 * | 7/2003 | Schutz | 494/12 |
| 2003/0196310 | A1 * | 10/2003 | Potter | 29/428 |
| 2003/0199380 | A1 * | 10/2003 | Potter | 494/12 |
| 2003/0199381 | A1 * | 10/2003 | Potter | 494/12 |
| 2004/0018928 | A1 * | 1/2004 | Schutz et al. | 494/12 |
| 2004/0220037 | A1 * | 11/2004 | Potter | 494/12 |
| 2004/0224831 | A1 * | 11/2004 | Potter | 494/12 |
| 2004/0229742 | A1 * | 11/2004 | Potter | 494/12 |
| 2005/0221971 | A1 * | 10/2005 | Potter | 494/37 |
| 2006/0058169 | A1 * | 3/2006 | Matusima | 494/84 |
| 2006/0240963 | A1 * | 10/2006 | Henne | 494/16 |
| 2008/0146429 | A1 * | 6/2008 | Woodman | 494/12 |

FOREIGN PATENT DOCUMENTS

| | | | |
|---|---|---|---|
| DE | 3805894 C1 | * | 3/1989 |
| DE | 3805896 C1 | * | 3/1989 |
| JP | 58006257 A | * | 1/1983 |
| JP | 7-284695 | * | 10/1995 |
| JP | 7-328486 | * | 12/1995 |

OTHER PUBLICATIONS

The International Bureau of WIPO, International Preliminary Report on Patentability, International Application No. PCT/US2007/025396, date of mailing Jun. 25, 2009.

* cited by examiner

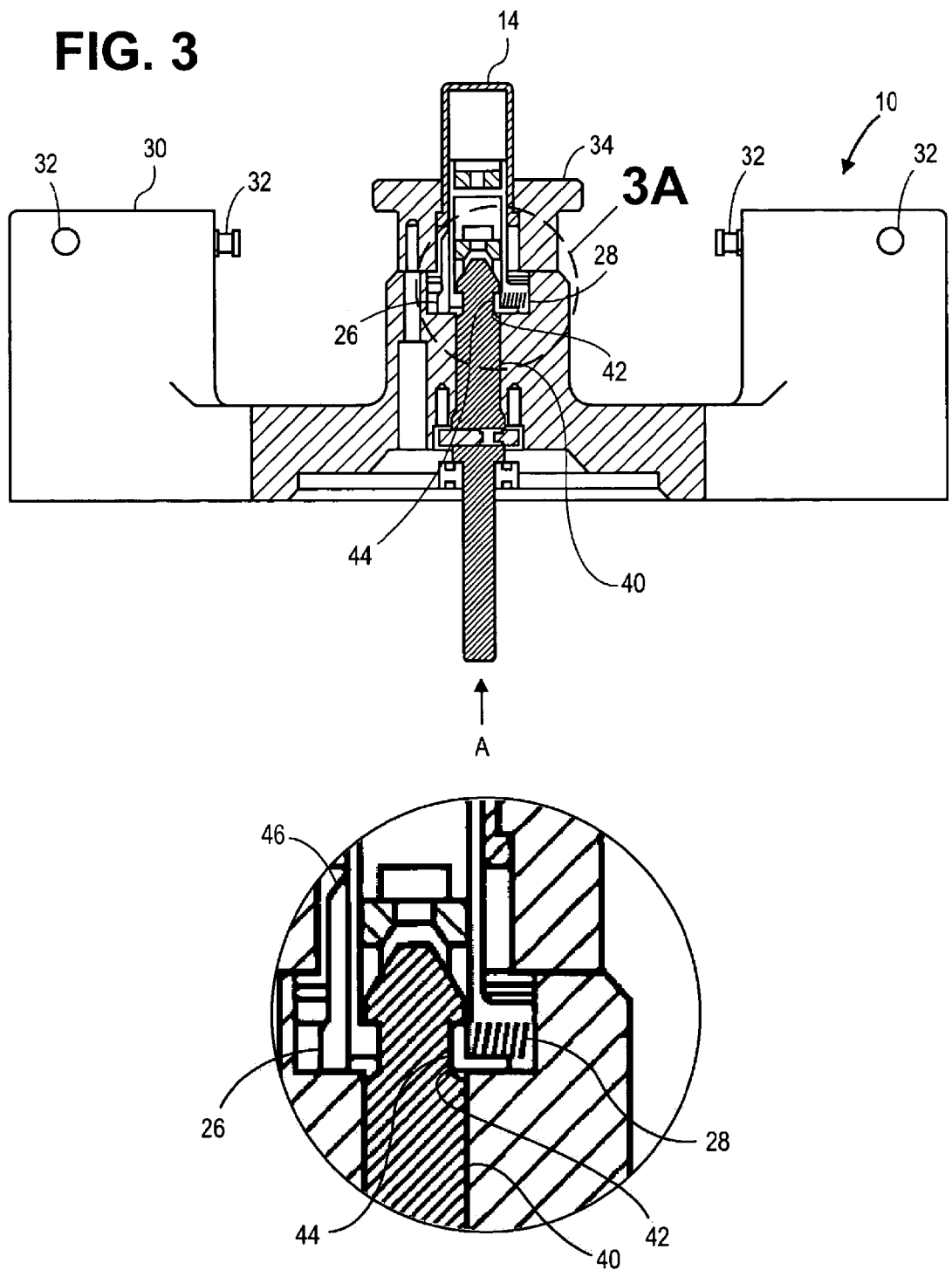

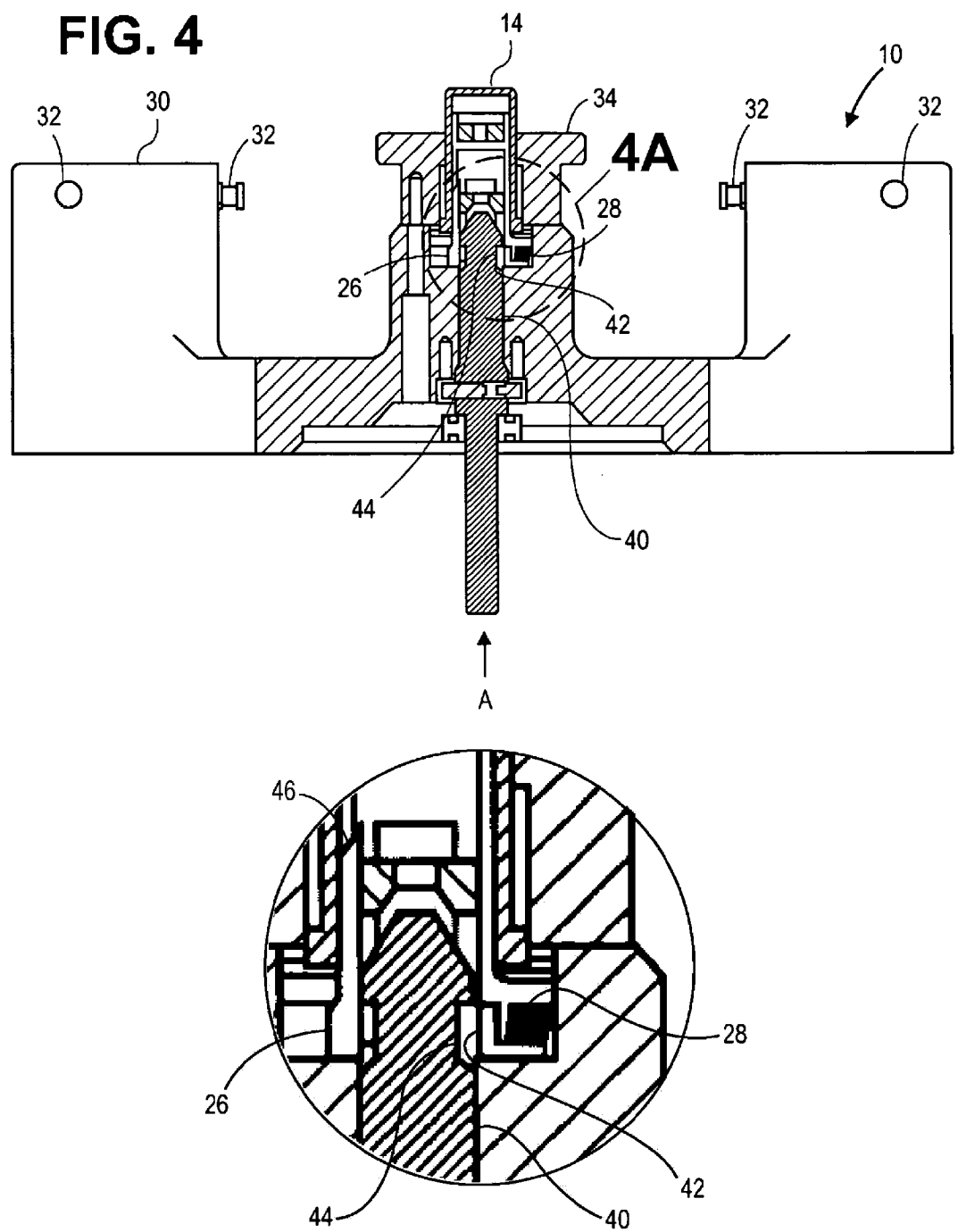

CENTRIFUGE ROTOR ASSEMBLY AND METHOD OF CONNECTION THEREOF

FIELD OF THE INVENTION

The present invention relates generally to rotor assemblies and to methods of attaching and operating rotor assemblies. More particularly, the present invention relates to centrifuge rotor assemblies and to methods of attaching and operating rotor assemblies in centrifuges.

BACKGROUND OF THE INVENTION

A currently available centrifuge typically includes a rotor that spins about a central shaft of the centrifuge. Connected to the rotor, either directly or indirectly, are one or more engagement mechanisms that allow for one or more sample holders (e.g., fluid-containing vials) to be connected to the rotor. Once the sample holders are connected to the rotor, the rotor begins spinning about the central shaft of the centrifuge and the sample holders, by virtue of being connected to the rotor, are also spun about the central shaft. This exposes the samples in the sample holders to centrifugal forces and allows the centrifuge to operate as desired.

In the above-discussed currently available centrifuge, in order to facilitate cleaning of the centrifuge, removal of the sample holders, and/or maintenance/repair of the centrifuge, the rotor is removable. More specifically, during the operation of the centrifuge, a knob with an internal threaded surface is used to fasten the rotor down onto the shaft. The knob is screwed onto the top of a threaded portion of the central shaft and, once properly screwed on and tightened, the knob prevents the rotor from moving relative to the central shaft. When it becomes desirable to detach the rotor from the centrifuge, the knob is unscrewed and the rotor is pulled/lifted away from the central shaft of the centrifuge.

SUMMARY OF THE INVENTION

At least in view of the above, what is needed are apparatuses and methods for quickly securing a rotor or rotor assembly to a centrifuge. Also needed are apparatuses and methods for quickly removing a rotor or rotor assembly from the centrifuge.

What is also needed are apparatuses and methods for securing a rotor or rotor assembly to the central shaft of a centrifuge in a manner that prevent the rotor or rotor assembly from being improperly secured to the central shaft or from coming loose from the central shaft during operation of the centrifuge.

What is further needed are apparatuses and methods for securing a rotor or rotor assembly to the center shaft of a centrifuge so as to prevent the loss or misplacement of rotor assembly and/or centrifuge components.

In addition to the above, what is further needed are apparatuses and methods for securing a rotor or rotor assembly to the center shaft of a centrifuge. These apparatuses and methods should prevent stripping of threads due to over-tightening of a knob when the rotor or rotor assembly is secured about the center shaft.

The foregoing needs are met, to a great extent, by the present invention, wherein in one embodiment thereof, a rotor assembly is provided. The rotor assembly includes an actuator moveable between a first position and a second position. The rotor assembly also includes an engagement mechanism connected and moveable relative to the actuator, wherein the engagement mechanism engages a portion of a centrifuge when the actuator is in the first position and disengages from the portion of the centrifuge when the actuator is in the second position.

In accordance with another embodiment of the present invention, a method of connecting a rotor assembly to a device is provided. The method includes placing a rotor assembly adjacent to a portion of a centrifuge. The method also includes latching the rotor assembly to the portion of the centrifuge using a latching mechanism.

In accordance with yet another embodiment of the present invention, another rotor assembly is provided. This other rotor assembly includes engaging means for engaging a portion of a centrifuge. This other rotor assembly also includes actuating means for actuating engagement of the portion of the centrifuge with the engaging means when the actuating means is in a first position and for actuating disengagement of the portion of the centrifuge with the engaging means when the actuating means is in a second position, wherein the engaging means is connected and moveable relative to the actuating means.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 3 illustrates a cross-sectional view of the rotor assembly as the rotor assembly is locked in place in a centrifuge.

FIG. 4 illustrates a cross-sectional view of the rotor assembly as the rotor assembly is in an unlocked position in a centrifuge.

DETAILED DESCRIPTION

Figure 1:
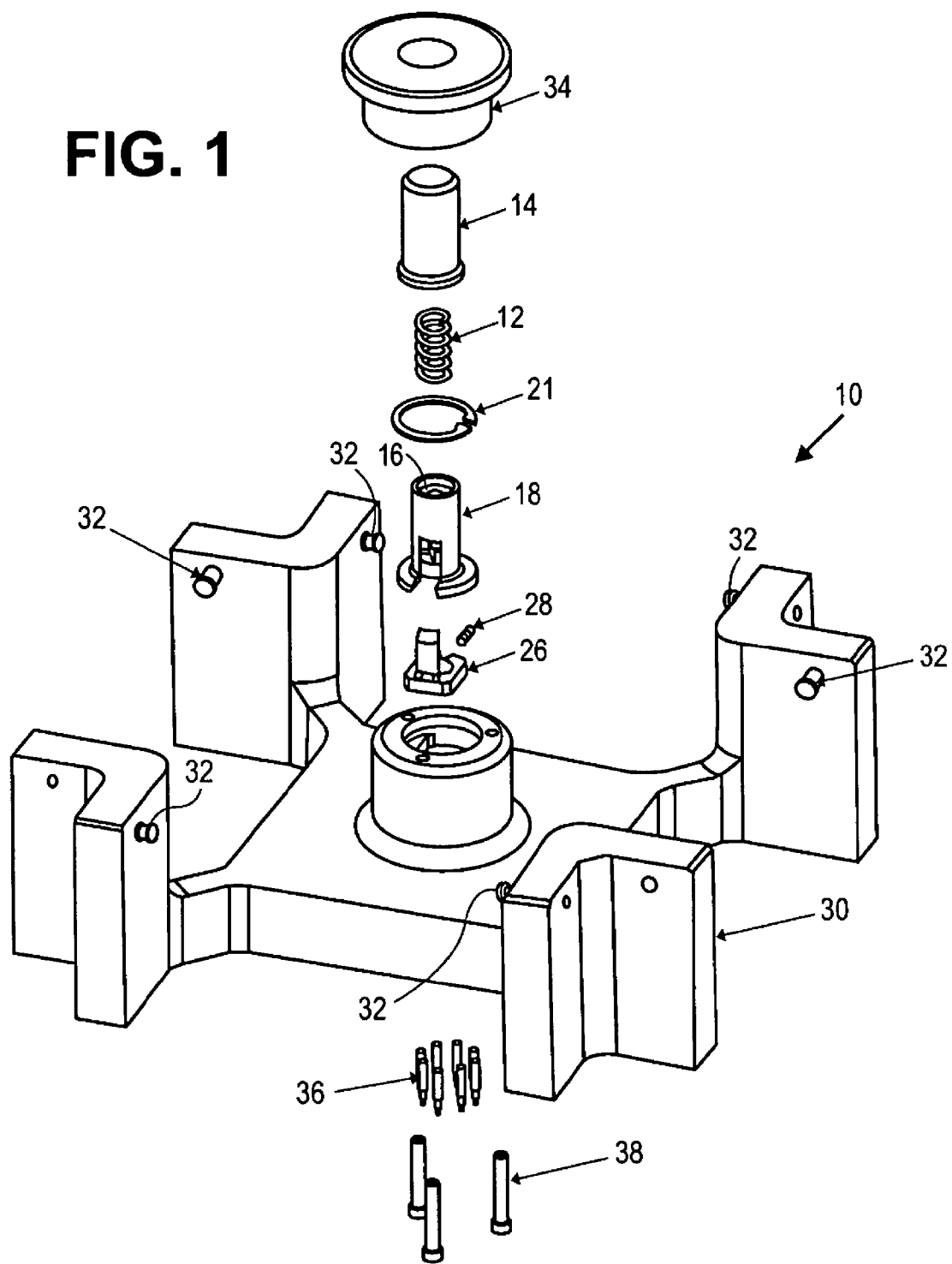
FIG. 1 illustrates an exploded view of a rotor assembly according to an embodiment of the present invention.
Figure 2:
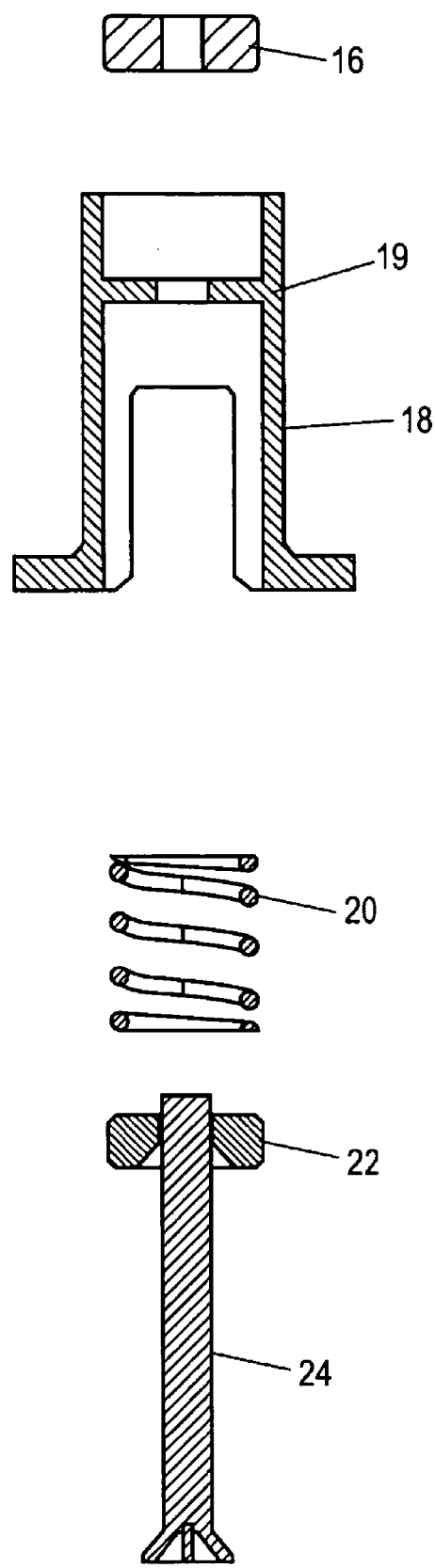
FIG. 2 illustrates an exploded view of a subset of components included in the rotor assembly.

The invention will now be described with reference to the drawing figures, in which like reference numerals refer to like parts throughout. FIG. 1 illustrates an exploded view of a rotor assembly 10 according to one representative embodiment of the present invention. FIG. 2 illustrates an exploded view of a subset of components included in the rotor assembly 10 illustrated in FIG. 1. As illustrated in FIGS. 1 and 2, the rotor assembly 10 includes an upper vertical spring 12 that extends between an inner bottom surface (not illustrated) of a button 14 and a top surface of an upper cap 16 that is positioned atop a button guide 18.

The button guide 18 includes two counter bores that create a shelf 19 and the button guide 18 generally enhances the stability of the button 14 by preventing the button 14 from swaying from side to side and/or from vibrating within the rotor assembly 10. As shown in FIG. 2, inside of the button guide 18 are included a lower vertical spring 20, a lower cap 22, and a fastener 24 (e.g., a screw or pin). The lower vertical spring 20 extends between a bottom surface of the shelf 19 and a top surface of a lower cap 22. The fastener 24 illustrated in FIG. 2 is a screw, extends through the lower cap 22 and the shelf 19 of the button guide 18, and is engaged with the upper cap 16 (e.g., the fastener 24 has threads that are screwed into an inner, mating surface the upper cap 16). The fastener 24 is also surrounded by the lower vertical spring 20.

According to one embodiment of the present invention, the upper vertical spring 12 is selected to have a compression rate of approximately 9 lbs. As such, according to this embodiment, a pressure of approximately 7 pounds (i.e., of less than approximately 10 pounds) may be applied to the top of the button 14 to move the button 14 from a fully raised position to a fully depressed position. Also, according to certain embodiments of the present invention, the lower vertical spring 20 is selected to be an approximately 50-pound spring.

As illustrated in FIG. 1, below the button guide 18 are located a slideable rotator shaft lock 26 and a horizontal spring 28. The rotator shaft lock 26 typically is supported by a portion of an upper surface of a rotor 30, as illustrated in FIG. 1, and slides thereon. Surrounding at least a portion of each of the above-discussed components is a housing 34 that is configured to allow a portion of the button 14 to extend therethrough. As also illustrated in FIG. 1, a retaining ring 21 is used to secure the button guide 18 to the rotor 30.

Illustrated below the rotator shaft lock 26 is the above-mentioned rotor 30, which has a plurality of carrier pivot pins 32 connected thereto (e.g., by being screwed into a portion of the rotor 30). Illustrated below the rotor 30 is a plurality of tapered pins 36 and bolts 38. Upon assembly of the rotor assembly 10, the bolts 38 extend through the rotor 30 and are screwed into the housing 34, thereby keeping the components of the rotor assembly 10 contained within the housing 34. Using the carrier pivot pins 32, up to four sample holder (e.g., fluid containing vials) may be connected to the representative rotor 30 illustrated in FIG. 1. However, rotors configured to have more or fewer sample holders connected, either directly or indirectly, thereto are also within the scope of the present invention.

The above-discussed rotor assembly 10 may be conveniently and safely placed in a centrifuge or centrifugal vacuum concentrator, which typically includes a solvent trap, a heating element, and/or a vacuum producing mechanism and which often operates at a lower speed than a traditional centrifuge. The rotor assembly 10, according to certain embodiments of the present invention, is placed in the centrifuge or centrifugal vacuum concentrator using what one of skill in the art, upon practicing one or more embodiments of the present invention, will recognize as a type of quick-release mechanism. FIG. 3 illustrates a cross-sectional view of the rotor assembly 10 after the rotor assembly 10 has been locked in place in a centrifuge. FIG. 4 illustrates a cross-sectional view of the rotor assembly 10 as the rotor assembly 10 is in an unlocked position in a centrifuge. Typically, the rotor assembly 10 is connected to the centrifuge by aligning the rotor assembly 10 with a central shaft 40 that extends vertically out of the centrifuge and lowering the rotor assembly 10 onto the central shaft 40.

As illustrated in FIGS. 3 and 4, once connected to the centrifuge, the rotor assembly 10 surrounds the central shaft 40 of the centrifuge. In operation, the central shaft 40 rotates about an axis, A, and, when the rotor assembly 10 is locked to the central shaft 40 as illustrated in FIG. 3, the rotor assembly 10 and any sample holders connected thereto via carrier pivot pins 32 also spin about the axis, A.

In FIG. 3, the button 14 is in a raised position (i.e., the top of the button 14 is positioned at a maximal distance away from the top of the central shaft 40). Absent the application of a downward force by a technician or operator of the centrifuge, the button 14 is supported in this raised position by the two vertical springs 12, 20 illustrated in FIGS. 1 and 2.

As illustrated in FIG. 3, while in the raised position, the button 14 is located above the rotator shaft lock 26. Also, the rotator shaft lock 26 is biased to the left by the horizontal spring 28. In this left-biased position, a tab portion 42 of the rotator shaft lock 26 is inserted into a slot portion 44 of the central shaft 40. While the tab portion 42 is inserted into the slot portion 44 as shown in FIG. 3, the rotor assembly 10 is effectively latched to the central shaft 40 of the centrifuge. As such, the tab portion 42 prevents a centrifuge operator or technician from lifting the rotor assembly 10 off of the central shaft 40 and away from the centrifuge. In other words, the rotor assembly 10 is "locked" onto the centrifuge.

In FIG. 4, the button 14 is in a fully depressed position (i.e., the top of the button 14 is positioned at a minimal distance away from the top of the central shaft 40). This depressed position is typically achieved when a technician or centrifuge operator pushes down on the button 14 with a finger (e.g., a thumb) or a palm of a hand. However, buttons that require more force than can be comfortably exerted by a human finger or palm are also within the scope of the present invention.

As illustrated in FIGS. 3 and 4, the housing 34, which is typically rigid, prevents lateral (i.e., side-to-side) motion of the button 14. However, the component that resists lateral motion of the rotator shaft lock 26 in the above-discussed rotor assembly 10 is the horizontal spring 28, which is compressible. Since the upper edge 46 of the rotator shaft lock 26 (i.e., the edge positioned closest to the button 14 in FIG. 3) is tapered, when the button 14 is pushed down upon, the button 14 slides down relative to the rotator shaft lock 26, exerts a lateral force against the rotator shaft lock 26, and compresses the horizontal spring 28. As a result, the rotator shaft lock 26 moves to the right in FIG. 3, and the tab portion 42 of the rotator shaft lock 26 disengages from the slot portion 44 of the central shaft 40. The entire rotor assembly 10 may then be lifted off of the central shaft 40 and removed from the centrifuge. In other words, the rotor assembly 10 is in an "unlocked" position.

One advantage of the above-described rotor assembly 10 is that the rotor assembly 10 is not subject to being overly or under-tightened. This is in direct contrast to a centrifuge wherein the rotor is held in the centrifuge by a knob that is screwed onto the central shaft of the centrifuge above a rotor or rotor assembly. In a centrifuge that includes such a knob, when the knob is under-tightened, the rotor can disengage from the central shaft, potentially causing equipment damage and/or operator injury. On the other hand, when the knob is overly tightened, threads on the knob and/or shaft may be stripped, requiring potentially costly and time-consuming repair. As will be appreciated by one of skill in the art upon practicing one or more embodiments of the present invention, the rotor assembly 10 discussed above can neither be overly nor under-tightened.

Another advantage of the rotor assembly 10 discussed above is that it does not include any detachable components. In other words, all of the components illustrated in FIGS. 1 and 2 are either housed within the housing 34 or physically attached to one or more other components of the rotor assembly 10. In centrifuges that utilize knobs to secure the rotors or rotor assemblies, once the knobs are unscrewed, the knobs are no longer connected to any portion of the rotor or rotor assembly and may therefore be misplaced and/or lost by a technician or centrifuge operator. Again, since the rotor assembly 10 discussed above includes no detachable components, no components thereof can be lost.

Yet another advantage of the rotor assembly 10 discussed above is that it typically does not require the use of tools to either connect (i.e., mount) the rotor assembly 10 to a centrifuge or to disconnect the rotor assembly 10 from the centrifuge. Rather, a technician's or centrifuge operator's palm or finger may usually be used to disengage the tab portion 42 of the rotator shaft lock 26 from the slot portion 44 of the central shaft 40. This obviates the need for wrenches, pliers, and/or other tools, which are often used to tighten the knob in the above-mentioned knob-based centrifuges. However, as discussed above, apparatuses that require the use of more force than is comfortably provided by human thumbs and/or palms are also within the scope of the present invention.

According to another embodiment of the present invention, a method of connecting a rotor assembly such as, for example, the rotor assembly 10 discussed above, to a device (e.g., a centrifuge) is provided. The method includes placing a rotor assembly adjacent to a portion of a centrifuge. This step may be implanted, for example, by placing the rotor assembly 10 about the central shaft 40, as illustrated in FIG. 4.

The method also includes latching the rotor assembly to the portion of the centrifuge using a latching mechanism. This latching step may be implemented, for example, by placing the tab portion 42 of the rotator shaft lock 26 into the slot portion 44 of the central shaft 40. According to this embodiment, the combination of the horizontal spring 28 and rotator shaft lock 26 function as the latching mechanism.

The method further includes preventing unlatching of the rotor assembly from the portion of the centrifuge by biasing the latching mechanism in a latched position. According to certain embodiments of the present invention, this preventing step may be implemented using the horizontal spring 28. More specifically, as discussed above, the horizontal spring 28 is used to bias the rotator shaft lock 26 into the position illustrated in FIG. 3 wherein the rotor assembly 10 is locked onto central shaft 40 of the centrifuge.

The method also includes encasing a portion of the latch assembly within a housing. As will be appreciated by one of skill in the art upon practicing one or more embodiments of the present invention, this encasing step may be implemented using the housing 34 illustrated in FIG. 1. The housing 34 protects components of the rotor assembly 10 from being exposed to dust and, more generally, the environment. The housing 34 also ensures that all of the components of the rotor assembly 10 remain attached to the rotor assembly, thereby preventing the loss or misplacement of any of these components.

In addition to the above, the method also includes connecting the latching mechanism to the rotor assembly. This connecting step may be implemented, for example, by providing the rotator shaft lock 26 and horizontal spring 28 as the latching mechanism as discussed above and by physically connecting these two components to the other components of the rotor assembly 10 illustrated in FIG. 1. With respect to the horizontal spring 28, the ends thereof may be physically attached to the rotator shaft lock 26 and rotor 30, respectively. On the other hand, an actual physical connection is not necessary to implement this step, so long as the horizontal spring 28 is maintained in a sufficiently compressed position that the ends of the horizontal spring 28 are substantially prevented from moving relative to the rotator shaft lock 26 and rotor 30.

The above-discussed method also includes applying force to an actuator to unlatch the rotor assembly from the centrifuge. This step may be implemented, for example, by using the button 14 as the actuator and by pushing down on the button 14 using, for example, a thumb or the palm of a technician's hand. This pushing of the button 14, in turn, because of the upper tapered edge of the rotator shaft lock 26, will cause movement of the rotator shaft lock 26 illustrated in FIG. 3 to the right and will disengage (i.e., unlatch) the tab portion 42 of the rotator shaft lock 26 from the slot portion 44 of the central shaft 40.

The above-discussed method also includes biasing the actuator with a resilient member that at least partially counteracts the force applied to the actuator when unlatching the rotor assembly from the centrifuge. This step may be implemented, for example, using the horizontal spring 28 to bias the rotator shaft lock 26 to the left, as illustrated in FIGS. 3 and 4.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A rotor assembly, comprising:
   a rotor;
   a guide supported by the and having a longitudinal axis;
   an actuator mounted to the guide and being moveable between a first position and a second position;
   a resilient member extending axially between the actuator and the guide, the resilient member being configured to bias the actuator to the first position; and
   an engagement mechanism mounted to the rotor and being moveable relative to the actuator, wherein the engagement mechanism engages a portion of a centrifuge when the actuator is in the first position and disengages from the portion of the centrifuge when the actuator is in the second position.

2. The rotor assembly of claim 1, wherein the portion of the centrifuge comprises a shaft.

3. The rotor assembly of claim 1, wherein the actuator comprises a button that is moveable between the first position and the second position upon application of force thereon of less than approximately 10 pounds.

4. The rotor assembly of claim 1, further comprising a resilient member positioned adjacent to the engagement mechanism and configured to apply a restorative force upon the engagement mechanism that biases the engagement mechanism toward a position wherein the engagement mechanism is engaged with the portion of the centrifuge.

5. The rotor assembly of claim 1, wherein the resilient member comprises a spring.

6. The rotor assembly of claim 1, wherein the engaging mechanism includes a tapered portion positioned adjacent to the actuator when the actuator is in the second position.

7. The rotor assembly of claim 1, further comprising:
a sample holder reception region connected to the rotor and configured to receive and hold a sample holder adjacent to the rotor.

8. The rotor assembly of claim 1, wherein the resilient member comprises two springs.

9. The rotor assembly of claim 1, further comprising:
a housing that surrounds portions of the actuator, the engagement mechanism, and the resilient member.

10. The rotor assembly of claim 1, wherein the engagement mechanism engages a portion of a centrifugal vacuum concentrator.

11. A method of connecting a rotor assembly to a centrifuge, the rotor assembly having a rotor, a guide supported by the rotor and having a longitudinal axis, an actuator mounted to the guide, a resilient member extending axially between the actuator and the guide, and a latching mechanism mounted to the rotor and being moveable relative to the actuator, the method comprising:
placing the rotor assembly adjacent to a portion of a centrifuge;
latching the rotor assembly to the portion of the centrifuge using the latching mechanism mounted to the rotor assembly; and
unlatching the rotor assembly using the actuator mounted to the rotor assembly.

12. The method of claim 11, further comprising:
preventing unlatching of the rotor assembly from the portion of the centrifuge by biasing the latching mechanism in a latched position.

13. The method of claim 11, further comprising:
encasing a portion of the latch assembly within a housing.

14. The method of claim 11, further comprising:
applying force to the actuator to unlatch the rotor assembly from the centrifuge.

15. The method of claim 14, further comprising:
biasing the actuator with a resilient member that at least partially counteracts the force applied to the actuator when unlatching the rotor assembly from the centrifuge.

16. The method of claim 14, wherein the applying force step comprises pressing on a button to unlatch the rotor assembly from the centrifuge.

17. A rotor assembly, comprising:
a centrifuge rotor;
a guide supported by the rotor and having a longitudinal axis;
a button mounted to the guide and moveable between a first position and a second position;
a resilient member extending axially between the button and the guide, the resilient member being configured to bias the button to the first position;
a locking mechanism mounted to the rotor and being positioned adjacent to the button; and
a tab protruding from the locking mechanism and configured to engage a portion of a centrifuge when the button is in the first position.

* * * * *

UNITED STATES PATENT AND TRADEMARK OFFICE
CERTIFICATE OF CORRECTION

| | | |
|---|---|---|
| PATENT NO. | : 7,837,607 B2 | Page 1 of 1 |
| APPLICATION NO. | : 11/637920 | |
| DATED | : November 23, 2010 | |
| INVENTOR(S) | : James R. Woodman | |

It is certified that error appears in the above-identified patent and that said Letters Patent is hereby corrected as shown below:

In column 1, line 47, change "in a manner that prevent the rotor" to --in a manner that prevents the rotor--.

In column 3, line 46, change "up to four sample holder" to --up to four sample holders--.

In column 5, line 42, change "the horizontal spring 28 and rotator shaft lock 26 function" to --the horizontal spring 28 and rotator shaft lock 26 functions--.

In column 6, line 42, claim 1, change "a guide supported by the and having" to --a guide supported by the rotor and having--.

Signed and Sealed this
First Day of February, 2011

David J. Kappos
*Director of the United States Patent and Trademark Office*